May 12, 1925. 1,537,629
J. A. STREET
COUPLING MECHANISM
Filed Aug. 25, 1923 2 Sheets-Sheet 2

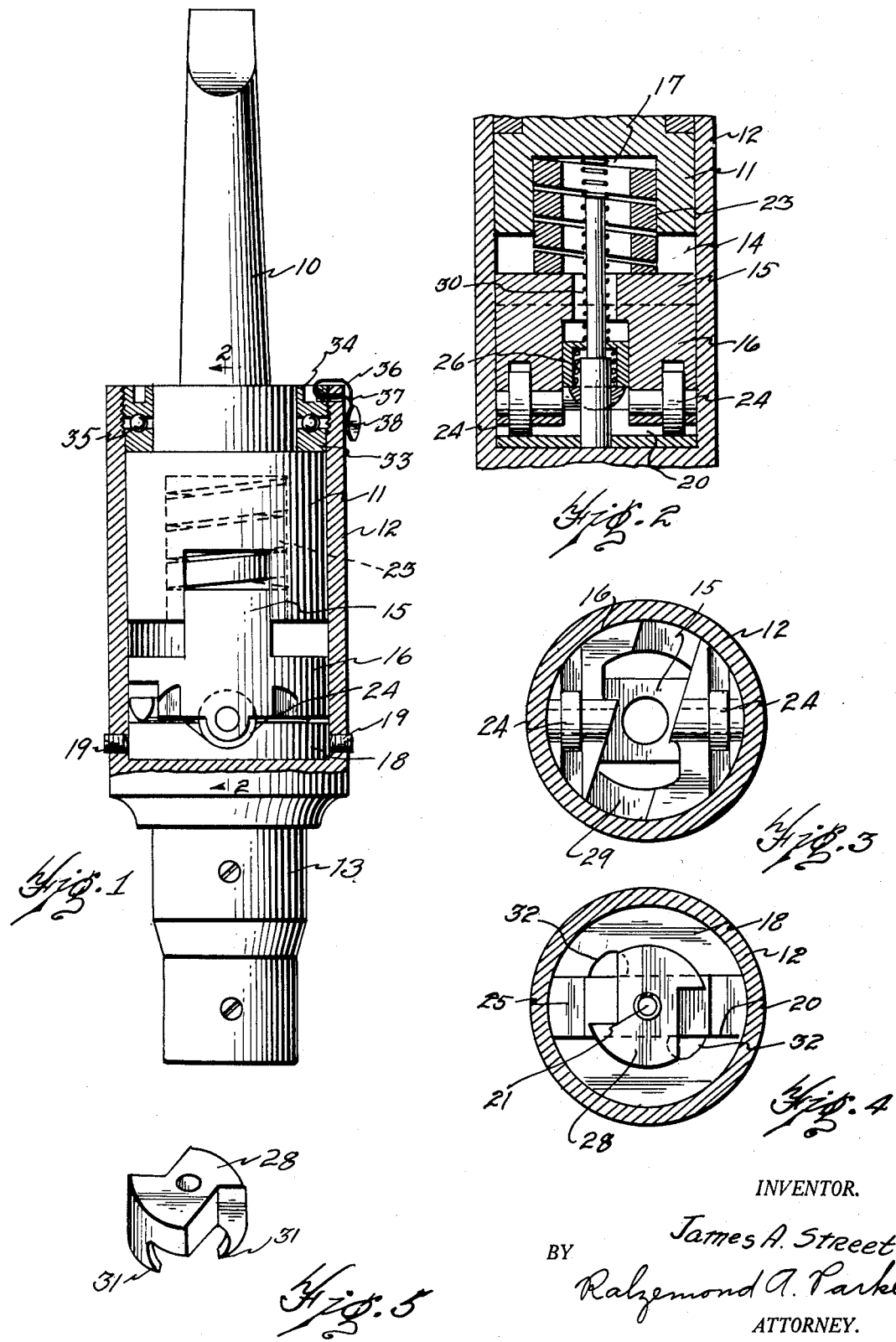

INVENTOR.
James A. Street
BY
Ralzemond A. Parker
ATTORNEY.

Patented May 12, 1925.

1,537,629

UNITED STATES PATENT OFFICE.

JAMES A. STREET, OF DETROIT, MICHIGAN, ASSIGNOR OF ONE-HALF TO HUGO C. ZEITZ, OF CLARKSBURG, WEST VIRGINIA.

COUPLING MECHANISM.

Application filed August 25, 1923. Serial No. 659,328.

*To all whom it may concern:*

Be it known that I, JAMES A. STREET, a citizen of the United States, residing at Detroit, county of Wayne, State of Michigan, have invented a certain new and useful Improvement in Coupling Mechanism, and declare the following to be a full, clear, and exact description of the same, such as will enable others skilled in the art to which it pertains to make and use the same, reference being had to the accompanying drawings, which form a part of this specification.

My invention relates to coupling mechanism and to that type adapted to so couple a rotatable driving member with a rotatable driven member that the two sections will rotate as one piece but the coupling mechanism will release to permit the driving member to overrun the driven member upon the resistance to rotation reaching a determined point.

It is here exemplified in connection with a tool-holding chuck, for which use it is particularly well adapted. The coupler, however, could be used as a shaft coupler or elsewhere where such a type of coupling mechanism was desirable.

My improved coupler is of simple, sturdy construction, easily assembled and positive in operation, and comprises a minimum number of operating parts.

A more particular description of the illustrative embodiment of my invention, together with the meritorious features of my invention, will appear from the following specification, appended claims and accompanying drawing, in which:

Figure 1 is a side elevation, partly broken away to show the coupling mechanism.

Fig. 2 is a vertical sectional view taken on the line 2—2 of Fig. 1.

Fig. 3 is a plan view looking upward at the coupler head.

Fig. 4 is a plan view looking downward upon the coupler plate.

Fig. 5 is a perspective of the fillet control device carried by the coupler head.

Figure 6:
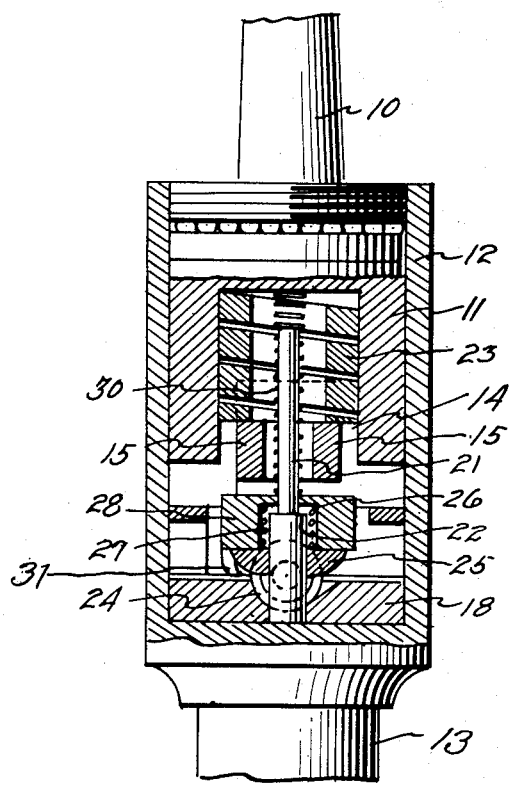
Fig. 6 is a vertical sectional view taken at right angles to the view in Fig. 2.
Figure 7:
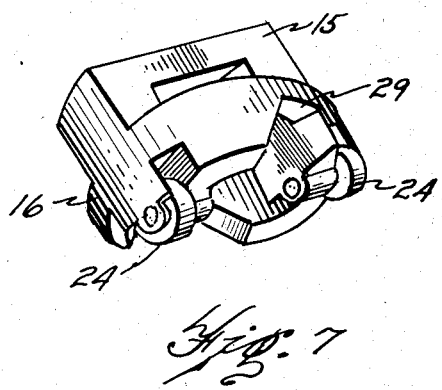
Fig. 7 is a perspective of the coupler head.

In the illustrative embodiment of my invention shown in the accompanying drawings, let 10 indicate the driving member of a tool-holding chuck having a head 11 receivable within the barrel housing 12 of a driven member 13. Head 11 is diametrically recessed at 14 to receive the diametrical extension 15 of a coupler head 16 so that the coupler head will rotate with head 11, but is movable axially thereof. This coupler head is disposed within the barrel housing 12 and is held downwardly therein by a spring 23 which is located within an axial recess 17 in the driving head 11.

Figure 8:
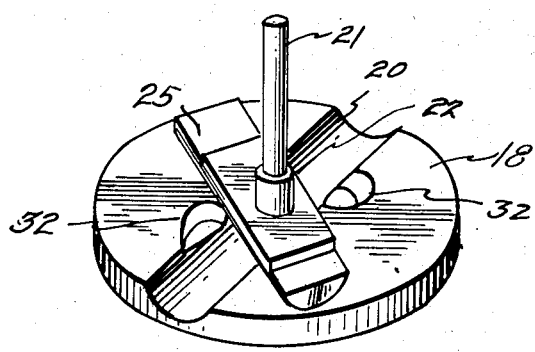
Fig. 8 is a perspective of the coupler plate and fillet.

Located in the bottom of the barrel casing 12 is a coupler plate 18 held releasably therein to rotate therewith by means of set-screws 19. This coupler plate 18 is diametrically recessed at 20, as will appear in Fig. 8, and carries an upwardly-extending stud 21 provided with an annular shoulder 22.

The diametrical recess 20 of the coupler plate is adapted to receive coupler rollers 24 carried by the head 16, which coupler head is held downwardly by means of spring 23 so that the rollers will engage in the recess. When the rollers are engaged in the recess of the coupler plate, the coupler plate and coupler head, and through these two operating members, the driving and the driven members of the tool-holding chuck rotate as one piece.

I provide a fillet 25 receivable within the recess 20 of the coupler plate and so shaped as to fill the same when the rollers are disengaged therefrom. This fillet is pivoted on the stud 21 of the coupler plate and is held downwardly by a spring 26 disposed within axial recess 27 formed in a fillet control member 28.

This fillet control member 28, which is shown in perspective in Fig. 5, is receivable within a transverse opening 29 in the face of the coupler head 16 so that the control member may be moved upwardly within the coupler head or moved downwardly below the plane of the rollers 24. This fillet control member is under the control of a spring 30 which extends upwardly through the coupler head, as appears in Figs. 2 and 6. The fillet control member has downwardly curved projecting teeth 31 so shaped that when the coupler head is rotated in a given direction and the fillet is disposed within the recess 20 the forwardly extending edges of the teeth 31 will engage underneath the fillet 25 by entering through the lateral recesses 32 into the diametrical recess 20 to lift the fillet 25 from such recess.

The operating mechanism is held within the barrel casing 12 by a bearing race comprising a lower race member 33 and an upper externally threaded annular race member 34 which has a threaded adjustment into the upper end of the barrel casing, and bearing balls 35 are provided between these race members. By threading the race member 34 into or out of the casing the tension on the springs controlling the operating mechanism may be regulated so that the device will release to a greater or a less resistance to rotation upon the driven member.

In the operation of the device, if we assume the rollers 24 engaged in the diametrical recess 20, as shown in Fig. 2, the driving and driven members of the chuck are locked together to rotate as one piece. This rotation will continue until the resistance imposed to rotation reaches that point at which the rollers swing out of the recess 20, the coupler head lifting against the tension of spring 23. This result would occur when, as in the case of a tool used in threading nuts on a bolt, the nut had been threaded home. The fillet 25 will rotate ahead of the rollers and the downwardly extending teeth 31 of the fillet control mechanism until it alines with the recess 20, when it falls therein and the rollers travel thereover. In this direction of rotation the fillet control member 28 is traveling in a clockwise direction as would appear looking down on the view in Fig. 4, or rather the driving member is rotating in a clockwise direction and the fillet control member travels therewith by virtue of its engagement in the recess 29 in the coupler head. So long as rotation is continued in this direction the fillet control member and the rollers will travel freely over the fillet which is disposed within the coupler plate recess 20 and the members will not engage for rotation as a unit.

When it is desired to couple the members together to rotate as a unit the direction of rotation is reversed. The prongs 31 on the fillet control member 28 now pick the fillet out of the recess 20 and the rollers 24 engage in this recess and the device is ready for operation.

The fillet control member is prevented from becoming locked to the fillet by means of the spring 26 which intervenes between the fillet and fillet control member.

I provide a safety lock in the form of a cable 36 which is receivable through registering apertures 37 in the wall of the barrel housing and the annular bearing ring 34, the ends of which cable are fastened together by a seal 38. By this means it is possible for the foreman in the shop to adjust the tool to release at a given resistance against rotation, which adjustment cannot be altered by the particular user of the tool without such fact being known.

What I claim is:

1. In a device of the class described, a driving member, a driven member, a coupler plate having a diametrical recess carried by one member, a coupler device carried by the other member and receivable within said recess to couple said members together to rotate as one piece, a fillet receivable within said recess to fill the same to the exclusion of the coupler device, a fillet control member operable when rotated in one direction to engage the fillet to remove it from the recess to permit the coupler device to engage therein and adapted when rotated in the opposite direction to travel freely over the fillet.

2. In a device of the class described, a driving member, a driven member, a coupler plate rotatable with one member and having a diametrical recess, a coupler device rotatable with the other member held yieldingly to engage in said recess to couple said members together, a fillet for said recess held yieldingly to engage therein when the coupler device is disengaged therefrom to permit the coupler device to travel freely over the recess without engaging therein, a fillet control member operable to travel freely over said fillet when rotated in one direction and adapted to engage the fillet and lift it from the recess to permit the coupler device to engage therein when rotated in the opposite direction.

3. In a device of the class described, a driving member, a driven member, one member recessed to receive a coupling device carried by the other member, a coupling device adapted to rotate with said other member held yieldingly to engage in said recess, a fillet held yieldingly to engage in said recess to fill the same when the coupling device is disengaged from the recess to permit said coupling device to rotate freely thereover enabling the one member to overrun the other, a fillet control member rotatable with said coupling device operable to travel freely over said fillet in the recess when rotated in one direction and adapted to engage said fillet and lift it from the recess to permit engagement of the coupling device therein when the direction of rotation is reversed.

4. In a device of the class described, a rotatable driving member, a driven member, one member provided with a coupling device, the other member recessed to receive said coupling device to engage said members to rotate as one piece, said coupling device disengageable from said recess to permit one member to overrun the other, a fillet adapted to fill said recess when the coupler device is disengaged therefrom to prevent the coupler device from again engaging therein so long as the driving member is rotated in a given direction, and means automatically operable to disengage said fillet from said recess to permit the coupler device to engage therein upon reversal of the direction of rotation of said driving member.

5. In a device of the class described, a driving member, a driven member, one member provided with a recess to receive a coupling device, the other member having a coupling device rotatable therewith receivable within said recess to cause said members to rotate as one-piece and releasable to permit one member to overrun the other, a fillet receivable within said recess to fill the same when the coupler device is disengaged therefrom to permit said coupler device to travel freely thereover when the one member is overrunning the other and so long as rotation continues in a given direction, and spring controlled means operable to lift the fillet from the recess automatically upon reversal of rotation to permit the coupling device to engage in the recess.

6. In a device of the class described, a driving member, a driven member, one member provided with a diametrical recess to receive a coupling device, a coupling device rotatable with said other member and movable axially relative thereof provided with rollers receivable within said recess to lock said members to rotate as a unit, a fillet held yieldingly to fill said recess when the coupler rollers are disengaged therefrom, said fillet axially movable to be lifted from said recess and relatively rotatable, an axially movable fillet control member rotatable with the coupling device, said fillet control member held yieldingly to engage said fillet to lift it from the recess when the fillet control member is rotated in one direction and adapted upon reversal of rotation to travel freely over the fillet without so engaging it.

7. In a device of the class described, a driving member, a coupler head rotatable therewith and having a movement axially thereof, a driven member having a barrel casing to receive said coupler head and provided with a coupler plate recessed to receive coupler rollers, rollers carried by said coupler head receivable within said recess to lock said driving and driven members together to rotate as a unit, means holding said coupler head yieldingly toward said plate, a fillet held yieldingly to fill said recess, a fillet control member rotatable with said coupler head, movable axially thereof, held yieldingly toward said fillet, operable to engage the fillet to lift the same from the recess when the coupler head is rotating in one direction and adapted to travel over the fillet without engaging the same when the direction of travel is reversed.

8. In a device of the class described, a rotatable driving member having a diametrically recessed head, a driven member having a barrel housing to receive the head of the driving member, a coupler head disposed within the barrel housing having a portion receivable within the recess of the driving head to rotate therewith but movable axially thereof, a spring disposed in a recess in the driving member adapted to exert downward pressure on the coupler head, rollers carried by the coupler head, a coupler plate removably disposed in the bottom of the barrel housing rotatable therewith, which plate is provided with a recess to receive the rollers of the coupler head to lock said members together to rotate as one piece, a fillet held yieldingly toward the coupler plate and receivable within the recess thereof to fill the same when the coupler rollers are disengaged therefrom so that the coupler rollers may travel freely thereover when the driving member is overrunning the driven member, a fillet control device rotatable with the coupler head, adapted to pick the fillet from the recess in the plate to permit said rollers to engage therein when the coupler head is rotated in one direction and adapted to travel freely over said fillet when the coupler head is rotated in the opposite direction, a stud carried by said coupler plate extending upwardly through said fillet and fillet control device, spring means intervening between said fillet control device and fillet to hold the fillet yieldingly downwards, a spring member extending through said coupler head to exert downward pressure on said fillet control device.

9. In a device of the class described, a rotatable driving member, a rotatable driven member, a coupler plate carried by one member having a recess for a coupling device, a coupler head rotatable with the other member but movable axially thereof provided with a coupler device receivable within said recess to couple said members together to rotate as one piece, a fillet for said recess adapted to fill the same so the coupler device will travel thereover or be lifted from the recess so the coupler device may engage therein, and a fillet control member rotatable with the coupler head, movable axially therewith and relative thereto, operable to lift the fillet from the recess when the coupler head is rotated in one direction and to travel thereover when the coupler head is rotated in the opposite direction.

In testimony whereof, I sign this specification.

JAMES A. STREET.